(12) United States Patent
Oettle et al.

(10) Patent No.: US 8,747,032 B2
(45) Date of Patent: *Jun. 10, 2014

(54) TOOL FOR MACHINING, IN PARTICULAR STRAIGHT TURNING TOOL

(75) Inventors: Matthias Oettle, Riederich (DE); Uli Ruoff, Dusslingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 69 days.

This patent is subject to a terminal disclaimer.

(21) Appl. No.: 13/178,158

(22) Filed: Jul. 7, 2011

(65) Prior Publication Data

US 2012/0009030 A1   Jan. 12, 2012

Related U.S. Application Data

(63) Continuation of application No. PCT/EP2009/009275, filed on Dec. 24, 2009.

(30) Foreign Application Priority Data

Jan. 7, 2009   (DE) .......................... 10 2009 004 631
Jun. 17, 2009   (DE) ..................... 20 2009 008 546 U (51) Int. Cl.
 *B23B 27/16*   (2006.01)

(52) U.S. Cl.
 USPC ........................................ 407/103; 407/107

(58) Field of Classification Search
 USPC .................. 407/103, 104, 107, 48, 40, 47
 See application file for complete search history.

(56) References Cited

U.S. PATENT DOCUMENTS

| 2,598,851 | A | | 6/1952 | Spevak |
| 3,137,918 | A | | 6/1964 | Breuning |
| 4,202,651 | A | | 5/1980 | St. Jean |
| 4,566,828 | A | * | 1/1986 | Reinauer ......................... 407/48 |
| 5,160,228 | A | * | 11/1992 | Arai et al. ....................... 407/32 |

(Continued)

FOREIGN PATENT DOCUMENTS

| DE | 2703696 A | * | 8/1978 |
| DE | 3301191 | | 7/1984 |

(Continued)

*Primary Examiner* — Daniel Howell
*Assistant Examiner* — Nicole N Ramos
(74) *Attorney, Agent, or Firm* — Saliwanchik, Lloyd & Eisenchenk (57) ABSTRACT

The present invention relates to a tool for machining a workpiece, comprising a tool body, a cutting tool and fastening means for fastening the cutting tool in an accommodating recess of the tool body, wherein the cutting tool has a cutting edge and a cutting tool through-bore, and wherein the tool body has a tool body through-bore opening into the accommodating recess. According to the invention, in order to provide a simple possibility of being able to change the cutting tool from both sides, depending on accessibility, the fastening means have a clamping bush provided with an internal thread and a clamping screw provided with an external thread corresponding with the internal thread of the clamping bush, the clamping screw is selectively either inserted through the cutting tool bore into the tool body bore and is screwed to the clamping bush or is inserted from the opposite side through the tool body bore into the cutting tool bore and is screwed to the clamping bush, wherein both ways of inserting of the clamping screw are enabled, and anti-rotation locking means are provided which prevent rotation of the clamping bush about the longitudinal axis thereof during the screwing-down and release by means of the clamping screw, wherein the anti-rotation locking means are formed by a tapered surface on the clamping hush and/or by a tapered surface on the clamping screw head, said tapered surfaces being adapted to at least part of the tool body bore and/or the cutting tool bore.

15 Claims, 7 Drawing Sheets

(56) References Cited

U.S. PATENT DOCUMENTS

| | | | |
|---|---|---|---|
| 6,050,751 A * | 4/2000 | Hellstrom | 407/104 |
| 7,322,777 B2 * | 1/2008 | Jager et al. | 408/153 |
| 2004/0028492 A1 | 2/2004 | Jager et al. | |
| 2011/0142556 A1 | 6/2011 | Oettle et al. | |

FOREIGN PATENT DOCUMENTS

| | | | |
|---|---|---|---|
| EP | 247011 A | * | 11/1987 |
| GB | 2002273 | | 2/1979 |
| GB | 2098105 A | * | 11/1982 |
| JP | 09029514 A | * | 2/1997 |
| JP | 09229038 A | * | 9/1997 |
| JP | 09262706 A | * | 10/1997 |
| JP | 11079105 | | 3/1999 |
| JP | 2000288822 A | * | 10/2000 |
| JP | 2001246516 A | * | 9/2001 |
| JP | 2004-508956 | | 3/2004 |
| JP | 2004-261931 | | 9/2004 |
| SU | 770667 | | 10/1980 |
| SU | 1364399 | | 1/1988 |

* cited by examiner

TOOL FOR MACHINING, IN PARTICULAR STRAIGHT TURNING TOOL

CROSS-REFERENCE TO RELATED APPLICATIONS

This application is a continuation of International Patent Application No. PCT/EP2009/009275, filed on 24 Dec. 2009 designating the United States and published as WO 2010/078948 A1, which claims priority to German Patent Application Nos. 10 2009 004 631.3, filed on 7 Jan. 2009 and 20 2009 008 546.5, filed on 17 Jun. 2009, all of which are hereby incorporated by reference in their entirety, including any figures, tables, or drawings.

BACKGROUND OF THE INVENTION

1. Field of the Invention

The present invention relates to a tool for machining a workpiece. The present invention relates in particular to a straight turning tool.

2. Related Prior Art

In known tools of this type, the cutting tool, for example a cutting insert, is fastened in the accommodating recess of the tool body by an internal thread being provided in the tool body bore. Engaging in this internal thread is a fastening screw having a corresponding external thread, and this fastening screw engages from the outside first of all through the cutting tool bore in the cutting tool and then engages in the tool body bore and is then tightened.

However, in straight turning automatic lathes, in which such tools, "straight turning tools", are frequently used, there is often little space for exchanging the cutting tool, which is a wearing part and frequently has to be changed, while the tool body remains clamped in the machine tool. However, since the screw with which the cutting tool is fastened to the tool body is only accessible from one side in the known tools, the entire tool, for changing the cutting tool, consequently often has to be removed from the machine tool and re-fitted again after the cutting tool change. This is awkward and leads to long setup times and is therefore to be avoided according to the invention.

A tool in which the fastening means for fastening the cutting tool to a tool body are accessible from two opposite sides and in which the problem described above is already solved in principle is known from WO 2003/074217. In this document, a special fastening element is used for fastening the cutting tool to the tool body, said fastening element having, at the front end thereof, special helical clamping wings which interact like a thread with corresponding support wings inside the cutting tool bore. The cutting tool is in this case fastened to the tool body by screwing this fastening element into the cutting tool bore, although the fastening element has to be turned by means of different keys from both sides for the tightening or release. The use of different keys is awkward and is therefore to be seen as a disadvantage in the manipulation of this tool.

Described in German Patent Application 10 2007 063 199.7-14 (date of filing: Dec. 19, 2007) and in the parallel application WO 2009/077060 A1 is a tool in which the problem described relating to the accessibility of the fastening means from two opposite sides is likewise solved in principle. Here, there is additionally the advantage that the tightening or release of the fastening means from both sides can be effected by means of the same key. The clamping means are realized here by a clamping screw and a clamping bush. So that counter-holding of the clamping bush is not necessary when screwing in the clamping screw and so that said clamping bush does not rotate, in particular a separate locking pin is provided as anti-rotation locking means.

SUMMARY OF THE INVENTION

The object of the present invention is to further improve a tool of this type comprising an interchangeable cutting tool, such that tightening or release of the fastening means from different sides is more easily facilitated, in which tool the fastening means are of simpler design and the same auxiliary tool can always be used irrespective of which side the fastening means are tightened or released.

In an aspect of the present invention a tool for machining a workpiece is provided comprising a tool body having a tool body through-bore opening into the accommodating recess, a cutting tool having a cutting edge and a cutting tool through-bore, fastening means for fastening the cutting tool in an accommodating recess of the tool body, said fastening means having a clamping bush provided with an internal thread and a clamping screw provided with an external thread corresponding with the internal thread of the clamping bush, wherein the clamping screw is selectively either inserted through the cutting tool bore into the tool body bore and is screwed to the clamping bush or is inserted from the opposite side through the tool body bore into the cutting tool bore and is screwed to the clamping bush, wherein both ways of inserting of the clamping screw are enabled, and anti-rotation locking means which prevent rotation of the clamping bush about the longitudinal axis thereof during the screwing-down and release by means of the clamping screw, wherein the anti-rotation locking means are formed by a tapered surface on the clamping bush and/or by a tapered surface on the clamping screw head, said tapered surfaces being adapted to at least part of the tool body bore and/or the cutting tool bore.

The invention in this case is based on the idea of configuring the tool and in particular the fastening means in such a way that both the clamping bush and the clamping screw can be inserted into the cutting tool bore or the tool body bore from both sides.

Depending on how the fastening means are more easily accessible when the tool is clamped in the machine tool in order to release the fastening means for the cutting tool change and then tighten said fastening means again, the clamping screw is either inserted through the cutting tool bore into the tool body bore and is screwed to the clamping bush or is inserted from the opposite side through the tool body bore into the cutting tool bore and is screwed to the clamping bush. In contrast to the solution known from WO 2003/074217, always only one and the same auxiliary tool is therefore required for changing the cutting tool, irrespective of the side on which the clamping screw sits.

Furthermore, the fastening means used according to the invention can be produced in a very simple and thus cost-effective manner. Support wings, as are used in WO 2003/074217, which are complicated and are thus expensive to produce, are dispensed with, and so the cutting tool which can be used according to the invention can be produced at a markedly lower cost.

Furthermore, anti-rotation locking means which prevent rotation of the clamping bush about the longitudinal axis thereof during the screwing-down and release by means of the clamping screw are provided according to the invention. The clamping screw can therefore be directly screwed to the clamping bush without counterholding of the clamping bush being additionally necessary. The tool therefore only has to be accessible on the side on which the clamping screw is screwed in.

The anti-rotation locking means are in this case formed by a tapered surface on the clamping bush and/or on the clamping screw, in particular on the head thereof, said tapered surface being adapted here to at least part of the tool body bore and/or the cutting tool bore. As a result of these tapered surfaces and corresponding beveled surfaces on the cutting tool bore and the tool body bore, a high surface pressure can he achieved and rotation of the clamping bush or of the clamping screw can be prevented, as described. If the clamping screw is therefore tightened, the tapered surface of the clamping bush, depending on the assembly method, is pressed against either the tapered surface of the tool body bore or the tapered surface of the cutting tool bore and is restrained as a result. It is likewise possible for the clamping bush to be tightened, as a result of which the clamping screw is correspondingly pressed against the tapered surface of the tool body bore or the tapered surface of the cutting tool bore and is restrained as a result. This type of anti-rotation locking means can be produced in a very simple and cost-effective manner.

According to the invention, no additional, separate anti-rotation locking means, such as a locking pin, is necessary. This additionally not only simplifies the manipulation and speeds up the operation of exchanging the cutting tool, but enables a narrower tool body to be realized, since a locking bore into which the locking pin is inserted no longer has to be provided here. The anti-rotation locking means are therefore in this case integrated directly into the fastening means.

A further possibility for realizing the anti-rotation locking is to roughen a surface on the clamping bush, which in the assembled state bears against the cutting tool bore and the friction between the clamping bush and the cutting tool bore is thereby increased. On the other hand, a surface configuration which makes possible a high surface pressure between the bearing surfaces of the clamping bush and of the cutting tool bore is also conceivable. As a result, rotation of the clamping bush is likewise prevented.

In one configuration, an internal thread is provided in the tool body bore, in which internal thread the external thread of the clamping screw can engage or is screwed thereto. As a result, in a configuration in which the clamping screw is inserted through the cutting tool bore into the tool body bore and is screwed to the internal thread of the tool body bore, the clamping bush is no longer absolutely necessary.

In order to additionally improve the anti-rotation locking of the clamping bush and the retention of the cutting tool in the accommodating recess, provision is preferably made for the tool body bore to be arranged in such a way that the bore axis thereof, when the cutting tool is inserted into the accommodating recess but is not yet screwed down, runs slightly offset from the bore axis of the cutting tool bore.

When the clamping screw is tightened, the cutting tool is therefore not only tightened in the direction of the bore axis of the tool body bore but also slightly in a direction transversely to this axis, preferably in a direction away from the inserted cutting edge and toward the bearing surfaces in the accommodating recess. As a result, the cutting tool is clamped even tighter in the accommodating recess.

If the anti-rotation locking means in the configuration described above are formed by a tapered surface on the clamping bush, the tapered surface is pressed against the cutting tool bore with additional pressure as a result of the slight eccentricity of the bore axis of the tool body bore and the bore axis of the cutting tool bore. Rotation of the clamping bush is therefore additionally countered.

Furthermore, provision is made in one configuration for the clamping bush to have a longitudinal through-bore. If the clamping screw is inserted from the one side through the cutting tool bore into the tool body bore and is screwed to the internal thread of the tool body bore, the clamping bush can be tightened via the clamping screw or can be screwed onto the latter. If the clamping screw is therefore inserted from the one side through the cutting tool bore into the tool body bore and is screwed to the internal thread of the tool body bore, the clamping bush is thus no longer absolutely necessary. However, as a result of the longitudinal through-bore of the clamping bush, said clamping bush can also be slipped over the clamping screw in this case and can thus be fitted together therewith. The clamping bush is then also "cleared away" and cannot be lost in the configurations in which it is not absolutely required.

In this case, provision is preferably made in a development for at least part of the longitudinal bore of the clamping bush to be adapted, in particular by a bevel, to the shape of the clamping screw head. This permits better seating of the clamping bush on the clamping screw when it is slipped over the latter. The clamping bush is therefore ideally adapted to the shape of the clamping screw, such that, when the clamping screw is screwed into the tool body bore, the outer surface of the clamping bush serves virtually as an enlargement of the clamping screw head and is pressed against the cutting tool bore.

In a further configuration, provision is preferably made for the clamping bush and the tool body bore to have a groove/feather-key connection in the inserted state. As a result of feather keys on the clamping bush and associated grooves in the tool body bore, the clamping bush can be inserted into the tool body bore in a positive-locking manner in the assembled state. In this case, the groove/feather-key connection additionally serves as anti-rotation locking means. Rotation of the clamping bush about the longitudinal axis thereof is thus ruled out. This offers, in particular at high torques, a simple and cost-effective solution in order to prevent rotation of the clamping bush.

Furthermore, in one configuration, provision is made for the clamping screw head to have a tapered surface which is adapted to at least part of the tool body bore and/or the cutting tool bore. If the tapered surface is adapted to at least part of the cutting tool bore, the clamping screw in this configuration can also be screwed directly through the cutting tool bore into the tool body bore without the clamping bush having to be slipped over the clamping screw in order thus to enlarge the clamping screw head. The clamping screw can therefore be inserted into the tool body bore from both sides and optimally terminates, in the assembled state, with the tool body bore or the cutting tool bore. Irrespective of the side on which the clamping screw is inserted, good seating of the clamping screw and thus tight screwing-down overall are therefore ensured.

Furthermore, in order to be able to tighten or release the clamping screw, provision is preferably made for the clamping screw to have a tool engagement means at the end face. This can be, for example, a hexagon socket for a hexagon key or an insert of a different configuration for accommodating a socket wrench, for example a TORX® wrench.

Furthermore, provision is preferably made in one configuration for the length of the clamping bush to correspond substantially to the thickness of the cutting tool.

In another aspect of the present invention a tool for machining a workpiece is provided comprising a tool body having a tool body through-bore opening into the accommodating recess, a cutting tool having a cutting edge and a cutting tool through-bore and fastening means for fastening the cutting tool in an accommodating recess of the tool body, said fastening means having a clamping bush provided with an internal thread and a clamping screw provided with an external thread corresponding with the internal thread of the clamping bush, wherein the tool body bore has an internal thread corresponding with the external thread of the clamping screw, and wherein the clamping screw is selectively either inserted through the cutting tool bore into the tool body bore and is screwed to the internal thread of the tool body bore or is inserted from the opposite side through the tool body bore into the cutting tool bore and is screwed to the clamping bush, wherein both ways of inserting of the clamping screw are enabled.

This configuration likewise offers the possibility of being able to change the cutting tool from both sides, depending on accessibility. Depending on how the fastening means are more easily accessible when the tool is clamped in the machine tool in order to release the fastening means for the cutting tool change and then tighten said fastening means again, the clamping screw is either inserted through the cutting tool bore into the tool body bore and is screwed to the internal thread of the tool body bore or is inserted from the opposite side through the tool body bore into the cutting tool bore and is screwed to the clamping bush. In contrast to the solution known from WO 2003/074217, always only one and the same auxiliary tool is therefore required for changing the cutting tool, irrespective of the side on which the clamping screw sits.

In this configuration, an internal thread is provided in the tool body bore, in which internal thread the external thread of the clamping screw can engage, or said internal thread is screwed to said external thread. As a result, in the case in which the clamping screw is inserted through the cutting tool bore into the tool body bore and is screwed to the internal thread of the tool body bore, the clamping bush is no longer absolutely necessary.

Furthermore, in this configuration too, the fastening means used according to the invention can be produced in a very simple and thus cost-effective manner. Support wings, as are used in WO 2003/074217, which are complicated and are thus expensive to produce, are dispensed with, and so the cutting tool which can be used according to the invention can be produced at a markedly lower cost.

In another aspect of the present invention a tool for machining a workpiece is provided comprising a tool body having a tool body through-bore opening into the accommodating recess, a cutting tool having a cutting edge and a cutting tool through-bore, a fastener that fastens the cutting tool in an accommodating recess of the tool body, said fastener having a clamping bush provided with an internal thread and a clamping screw provided with an external thread corresponding with the internal thread of the clamping bush, wherein the clamping screw is selectively either inserted through the cutting tool bore into the tool body bore and is screwed to the clamping bush or is inserted from the opposite side through the tool body bore into the cutting tool bore and is screwed to the clamping bush, wherein both ways of inserting of the clamping screw are enabled, and an anti-rotation lock which prevents rotation of the clamping bush about the longitudinal axis thereof during the screwing-down and release by means of the clamping screw, wherein the anti-rotation lock is formed by a tapered surface on the clamping bush and/or by a tapered surface on the clamping screw head, said tapered surfaces being adapted to at least part of the tool body bore and/or the cutting tool bore.

In another aspect of the present invention a tool for machining a workpiece is provided comprising a tool body having a tool body through-bore opening into the accommodating recess, a cutting tool having a cutting edge and a cutting tool through-bore and a fastener that fastens the cutting tool in an accommodating recess of the tool body, said fastener having a clamping bush provided with an internal thread and a clamping screw provided with an external thread corresponding with the internal thread of the clamping bush, wherein the tool body bore has an internal thread corresponding with the external thread of the clamping screw, and wherein the clamping screw is selectively either inserted through the cutting tool bore into the tool body bore and is screwed to the internal thread of the tool body bore or is inserted from the opposite side through the tool body bore into the cutting tool bore and is screwed to the clamping bush, wherein both ways of inserting of the clamping screw are enabled.

Furthermore, it goes without saying that the features of the last-mentioned configuration of the tool can likewise be combined with the features which are provided in the configurations explained above and which are defined in the dependent claims.

Likewise, in a further modification of the last-mentioned configuration, anti-rotation locking means are provided which prevent rotation of the clamping bush about the longitudinal axis thereof during the screwing-down and release by means of the clamping screw, wherein the anti-rotation locking means are formed by a tapered surface on the clamping bush and/or by a tapered surface on the clamping screw head, said tapered surfaces being adapted to at least part of the tool body bore and/or the cutting tool bore.

It goes without saying that the abovementioned features and the features still to be explained below can be used not only in the respectively specified combination but rather also in other combinations or on their own without departing from the scope of the present invention.

BRIEF DESCRIPTION OF THE DRAWINGS

Exemplary embodiments of the invention are shown in the drawings and are described in more detail below. In the drawings.

DESCRIPTION OF A PREFERRED EMBODIMENT

Figure 1:
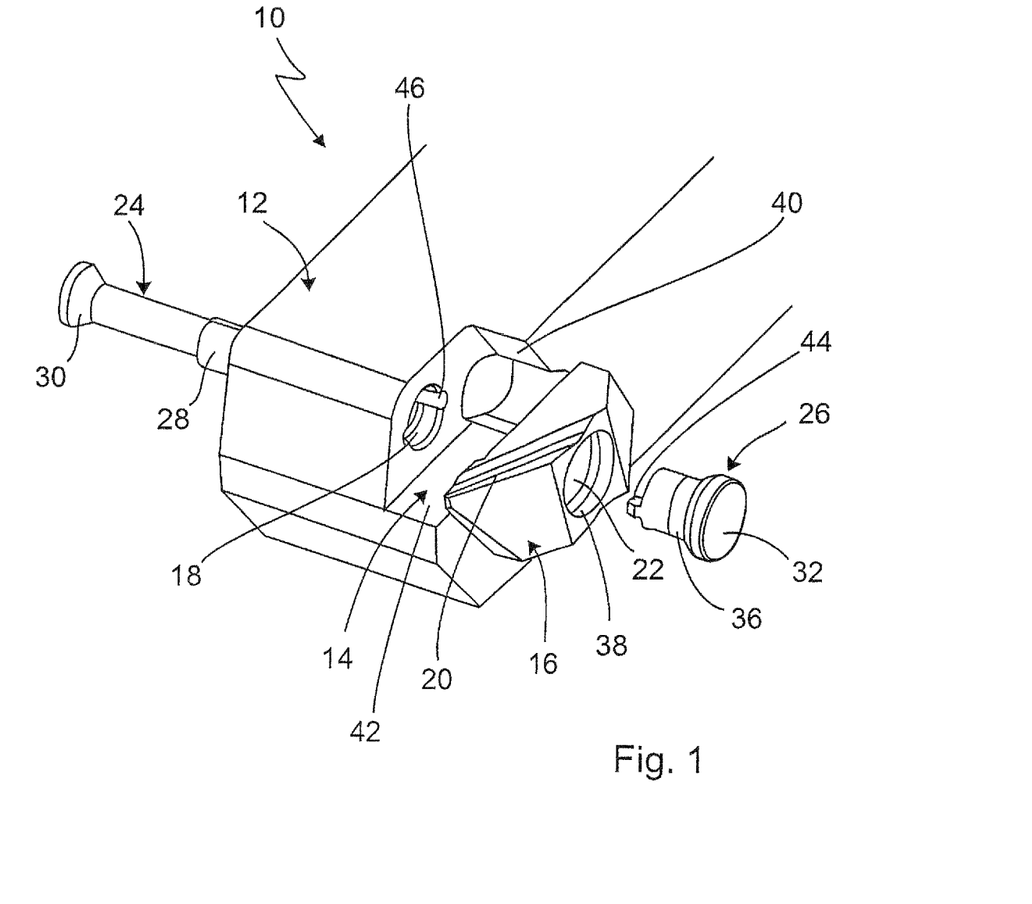
FIG. 1 shows a first embodiment of the tool according to the invention in the dismantled state.

FIG. 1 shows a first embodiment of the tool 10 according to the invention in the dismantled state. The tool body 12 can be seen, on the front lateral end of which an accommodating recess 14 for accommodating a cutting tool 16 is provided. A tool body bore 18 opening into the accommodating recess 14 is provided transversely in the front region of the tool body 12.

The cutting tool 16, in the present case an indexable cutting insert having two cutting edges 20 (the rear cutting edge cannot be seen in this illustration), has a central cutting tool through-bore 22.

According to the invention, a clamping screw 24 and a clamping bush 26 are provided as fastening means for fastening the cutting tool 16 in the accommodating recess 14. In this case, the clamping screw 24 has an external thread 28 and a clamping screw head 30, which is designed here as a countersunk head. In this configuration, the clamping bush 26 has a longitudinal through-bore 32, in which an internal thread 34 (which cannot be seen in this illustration) is at least partly cut, said internal thread 34 corresponding with the external thread 28 of the clamping screw 24.

Furthermore, on its outside, the clamping bush 26 has a tapered surface 36, which is adapted to the outer beveled part 38 of the cutting tool bore 22. In this case for example, the tapered surface 36 can be roughened in order to prevent rotation of the clamping bushes 26 about their longitudinal axis during the screwing-down and release of the clamping screw 24 by friction between the tapered surface 36 and the beveled part 38 of the cutting tool bore 22.

The friction between the two surfaces 36 and 38 referred to is additionally increased owing to the fact that the longitudinal axis of the tool body bore 18 is slightly offset from the longitudinal axis of the cutting tool bore 22 when the cutting tool 16 is inserted into the accommodating recess 14 but is not yet screwed down. As a result of the cutting tool bore 22 and the tool body bore 18 therefore lying slightly eccentrically relative to one another, the cutting tool 16 is still displaced slightly into the accommodating recess 14, that is to say toward the bearing surfaces 40 and 42.

As further anti-rotation locking of the clamping bush 26, one or more feather keys 44 (for example two feather keys) are attached to the front end of the clamping bush 26, which is inserted into the tool body bore, said feather keys 44 engaging in grooves 46 of the tool body bore 18 which are provided for this purpose. Thus, rotation of the clamping bush 26 with respect to the tool body bore 18 is directly prevented.

Figures 2, 3:
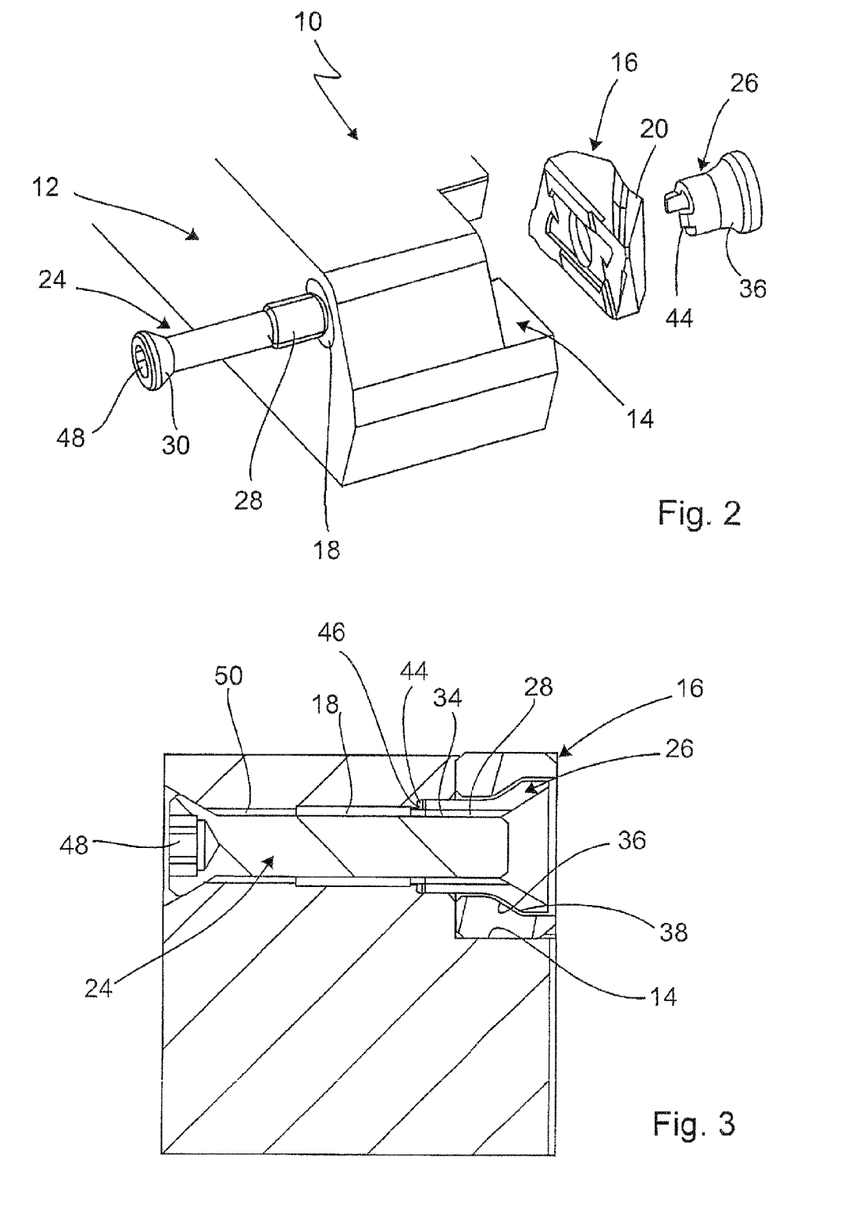
FIG. 2 shows an exploded illustration of the first embodiment of the tool according to the invention in a first assembly method.
FIG. 3 shows a sectional view of the first embodiment of the tool according to the invention in the first assembly method in the assembled state.

FIG. 2 shows the first embodiment, shown in FIG. 1, of the tool 10 according to the invention from the side remote from the accommodating recess 14. It can be seen here that the clamping screw 24 has a tool engagement means 48, for example a hexagon socket, TORX™ or TORX™ like engagement means. In this configuration, therefore, the clamping screw 24 can be screwed to the clamping bush 26, for example by means of a hexagon key.

The assembled state of this first embodiment is shown again enlarged in a sectional view in FIG. 3. It can be seen therein that an internal thread 50 is provided in the tool body bore 18 on the side remote from the accommodating recess 14, through which internal thread 50 the clamping screw 24 first of all has to be turned.

If the clamping screw 24 is therefore inserted into the tool body bore 18 from the left, as shown in FIG. 3, it is first turned through the internal thread 50, is then pushed through the central part of the tool body bore 18, in which no thread is provided, and is then screwed to the clamping bush 26 on the side of the cutting tool 16.

In the assembled state, the external thread 28 of the clamping screw 24 therefore engages directly in the internal thread 34 of the clamping bush 26. The internal thread 50 of the tool body bore 18 is of no importance in this assembly method, in which the clamping screw 24 is screwed in from the left as shown.

Furthermore, it becomes clear in FIG. 3 that the feather key(s) 44 of the clamping bush 26, as already described, engages (engage) in the grooves 46 of the tool body bore 18 provided for this purpose and thus prevents (prevent) rotation of the clamping bush 26. This effect is additionally enhanced by the friction between the tapered surface 36 of the clamping bush 26 and the beveled part 38 of the cutting tool bore 22. In fact just one of the two types of anti-rotation locking, that is to say either the groove/feather-key connection 44, 46 or the surface pressure or friction between the two surfaces 36 and 38, is sufficient in practice.

The anti-rotation locking ensures that the clamping screw 24 can be screwed to the clamping bush 26 without it being necessary in the process to counterhold the clamping bush 26 for fastening the cutting tool 16. This is advantageous in particular when there is no adequate space on the side of the cutting tool 16 or of the clamping bush 26. As already mentioned at the beginning, this is often the case in straight turning automatic lathes, in which the cutting tool 16 has to be exchanged frequently, while the tool body 12 remains clamped in the machine tool.

In addition, it is in each case advantageous that the anti-rotation locking means 36, 38, 44, 46 are integrated directly into the clamping hush 26 and respectively the tool body bore 18 and the cutting tool bore 22. Therefore no additional components, thus also no additional working steps, for the anti-rotation locking of the clamping bush 26 are necessary.

Figure 4:
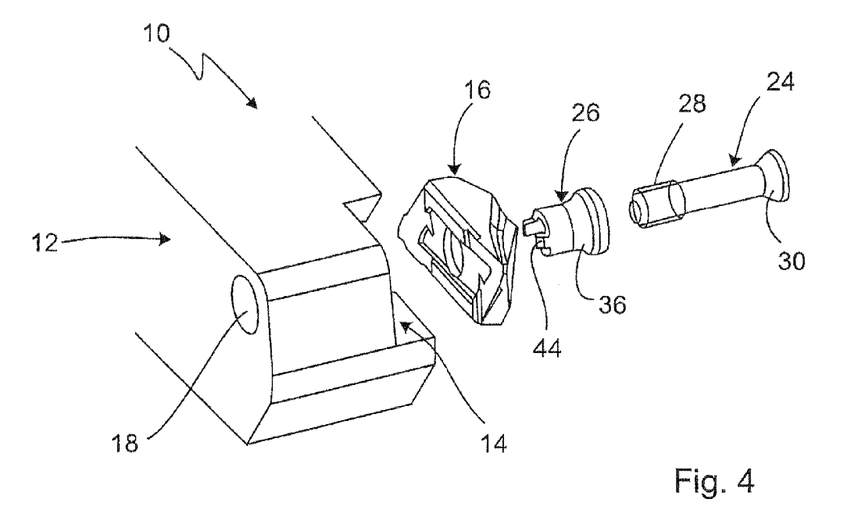
FIG. 4 shows an exploded illustration of the first embodiment of the tool according to the invention in a second assembly method.

The first type of assembly method for the tool according to the invention is therefore used when there is very little space for changing the cutting tool 16 on the side of the tool 10 on which the cutting tool 16 is arranged. However, if there is sufficient space on this side, there is alternatively the possibility of using the same components of the tool 10 in a second assembly method, as shown in FIG. 4 in the dismantled state. The same parts are provided therein with the same reference numerals.

As can easily be seen, the clamping screw 24, compared with the first assembly method shown in FIG. 2, is now arranged on the right-hand side (on the side of the cutting tool 16).

Figure 5:
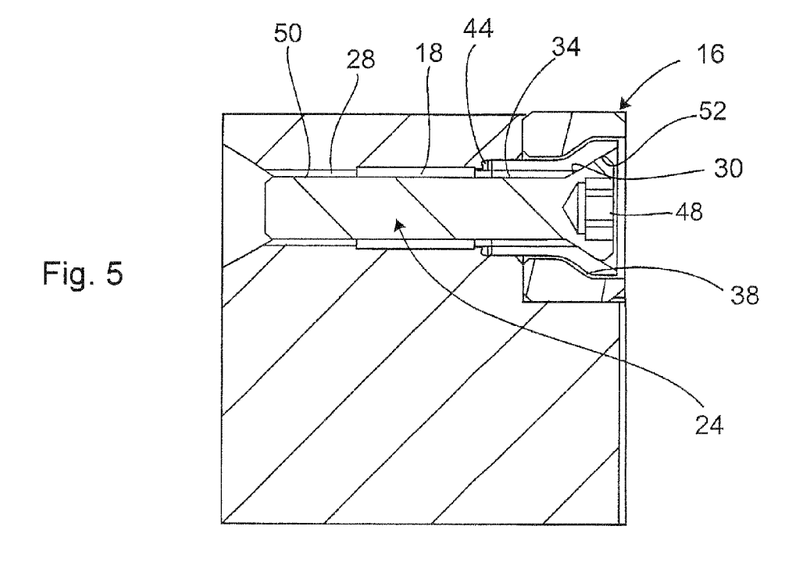
FIG. 5 shows a sectional view of the first embodiment of the tool according to the invention in the second assembly method in the assembled state.

As can be seen from the assembled state, shown in FIG. 5, of this second assembly method, the clamping screw 24 is first of all screwed through the clamping bush 26. Since the clamping bush 26, as already described (see FIG. 1), has a longitudinal through-bore 32 and an internal thread 34 which corresponds with the external thread 28 of the clamping screw 24, the clamping screw 24 can therefore also be screwed through the clamping bush 26 from the other side, that is to say that side of the clamping bush 26 which is remote from the feather keys 44. Since the external thread 28 is arranged only on the front part of the clamping screw 24, the clamping bush, after overcoming the external thread 28, can be pushed over the clamping screw 24 to the rear right up to the countersunk head 30. Since the longitudinal through-bore 32 of the clamping bush 26 has a bevel 52 which corresponds with the countersunk head 30 of the clamping screw 24, the clamping bush 26 can be slipped completely over the clamping screw 24 in the fitted state.

Compared with the first assembly method (cf. FIG. 3), the clamping bush 26 therefore sits at the same point again relative to the cutting tool 16 and the tool body bore 18.

The cutting tool 16 is fixed in this second assembly method by virtue of the fact that the external thread 28 of the clamping screw 24 engages in the internal thread 50 of the tool body bore 18 and therefore the clamping bush 26 slipped over it is pressed against the cutting tool 16 and the cutting tool 16 is pressed into the accommodating recess 14.

The tool 10 according to the invention therefore offers the possibility of using fastening elements in a variable manner and from different sides in order thus to take into account the existing possibilities with respect to the accessibility of the tool. The fastening means are in this case of very simple design and as a result can also be produced cost-effectively.

In contrast to German Patent Application 10 2007 063 199.7-14 described at the beginning, the present invention shows a further-improved configuration of the anti-rotation locking means, which are integrated directly into the existing components and require no additional aids. Since, in contrast to said German Patent Application, no locking bore for inserting a locking pin has to be provided in the tool body 12, the tool body 12 according to the present invention can be designed to be substantially narrower. This produces additional advantages in the manipulation of the tool and opens up the possibility of an additional space saving.

A second embodiment of the tool 10 according to the invention is shown in FIGS. 6 to 9.

Figure 6:
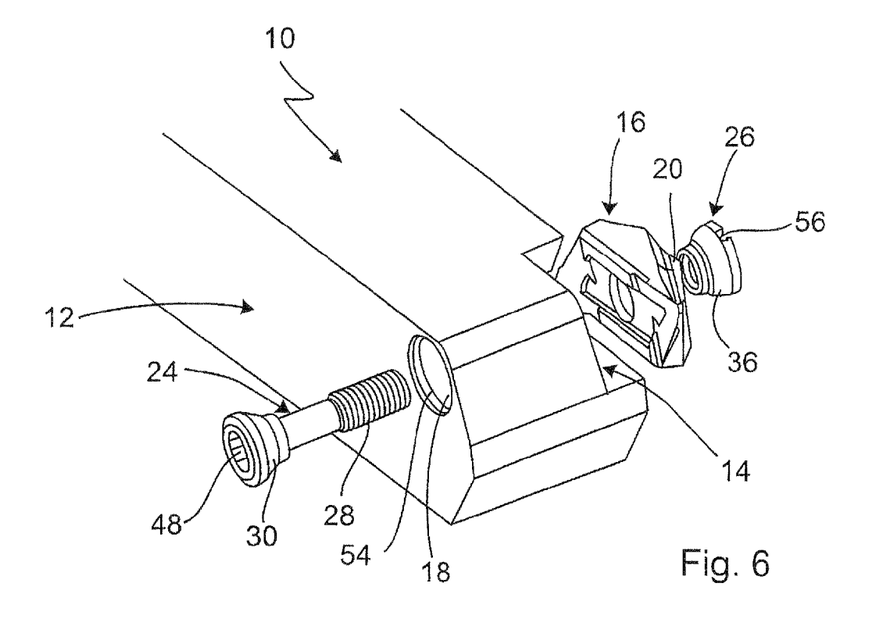
FIG. 6 shows an exploded illustration of a second embodiment of the tool according to the invention in a first assembly method.
Figure 7:
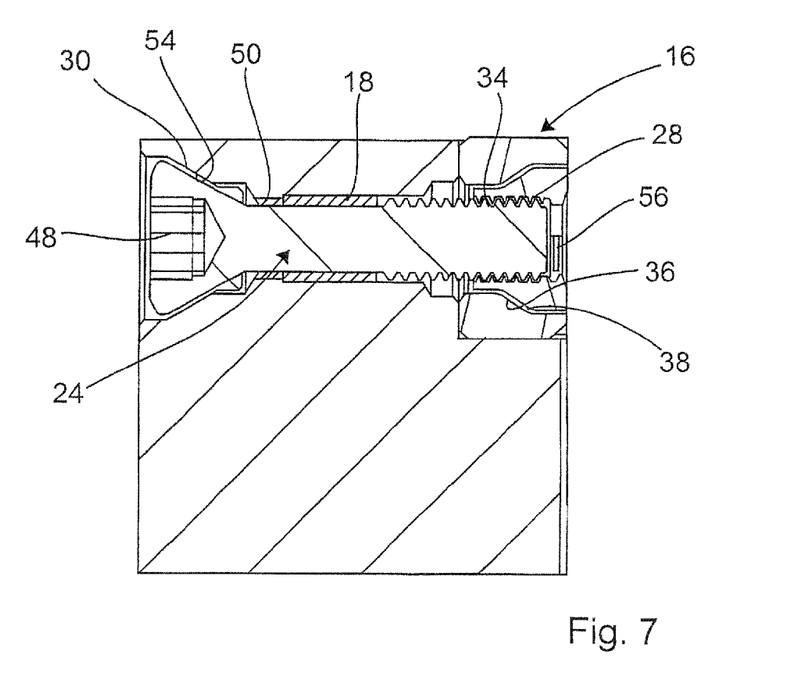
FIG. 7 shows a sectional view of the second embodiment of the tool according to the invention in the first assembly method in the assembled state.

In FIGS. 6 and 7, the clamping screw 24, as in the first assembly method shown in FIGS. 1 to 3, is inserted into the tool body bore 18 of the tool body 12 from the left. Here, however, compared with the first embodiment of the tool 10 according to the invention, the clamping screw 24 and the clamping bush 26 are of different design. Relatively small changes to the tool body bore 18 have likewise been made.

Here, the countersunk head 30 of the clamping screw 24 is of larger design. Accordingly, the tool body bore 18, on the side remote from the accommodating recess 14, is designed as a stepped bore having a bevel 54 which is adapted to the enlarged countersunk head 30 of the clamping screw 24.

Here, the clamping bush 26 is preferably not provided with a longitudinal through-bore 32, as in the first embodiment of the tool 10 (cf. FIGS. 1-5), but rather is closed on the one side (however a blind-hole thread or a through-thread can also be arranged there), a tool engagement means 56 being provided here. This tool engagement means can be designed as a slot or a cross recess for a screwdriver. In this embodiment, the tool body bore 18 likewise has an internal thread 50, through which the clamping screw 24 has to be screwed.

Figure 8:
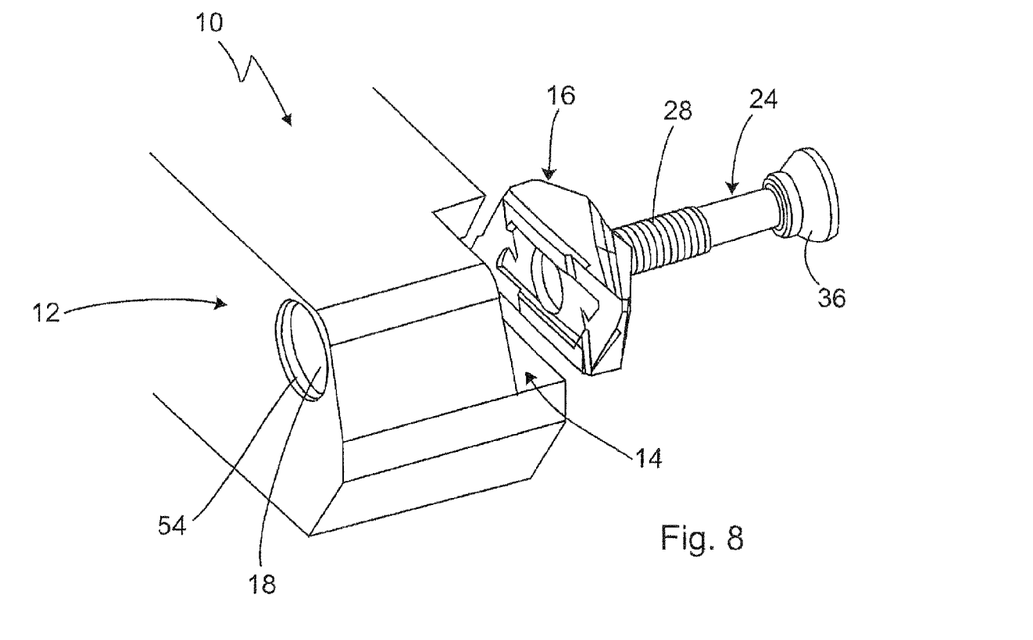
FIG. 8 shows an exploded illustration of the second embodiment of the tool according to the invention in a second assembly method.
Figure 9:
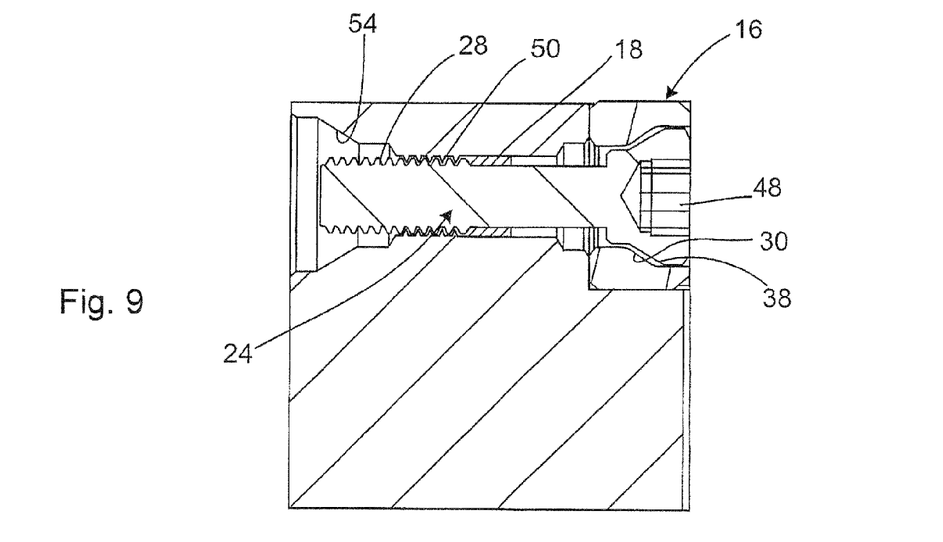
FIG. 9 shows a sectional view of the second embodiment of the tool according to the invention in the second assembly method in the assembled state.

From the second assembly method of the second embodiment, which is shown in FIGS. 8 and 9, it becomes clear why the countersunk head 30 of the clamping screw 24 in the second embodiment is designed to be larger than in the first embodiment. This is because the clamping bush 26 can thereby be omitted in the second assembly method of the second embodiment, in which the clamping screw 24 is screwed into the tool body bore 18 from the side of the cutting tool 16. This is possible owing to the fact that the countersunk head 30 of the clamping screw 24 is designed to be larger there and is thus adapted to the beveled part 38 of the cutting tool bore 22.

As a result of the slight eccentricity of the tool body bore 18 and the cutting tool bore 22, the cutting tool 16 is again pressed into the accommodating recess 14, although now directly by the countersunk head 30 of the clamping screw 24. As in the second assembly method of the first embodiment, in which the clamping screw 24 is likewise inserted into the tool body bore 18 from the right (cf. FIGS. 4 and 5), the clamping screw 24 is screwed with its external thread 28 to the internal thread 50 of the tool body bore 18.

A third embodiment of the tool 10 according to the invention is shown in FIGS. 10 to 13.

Figure 10:
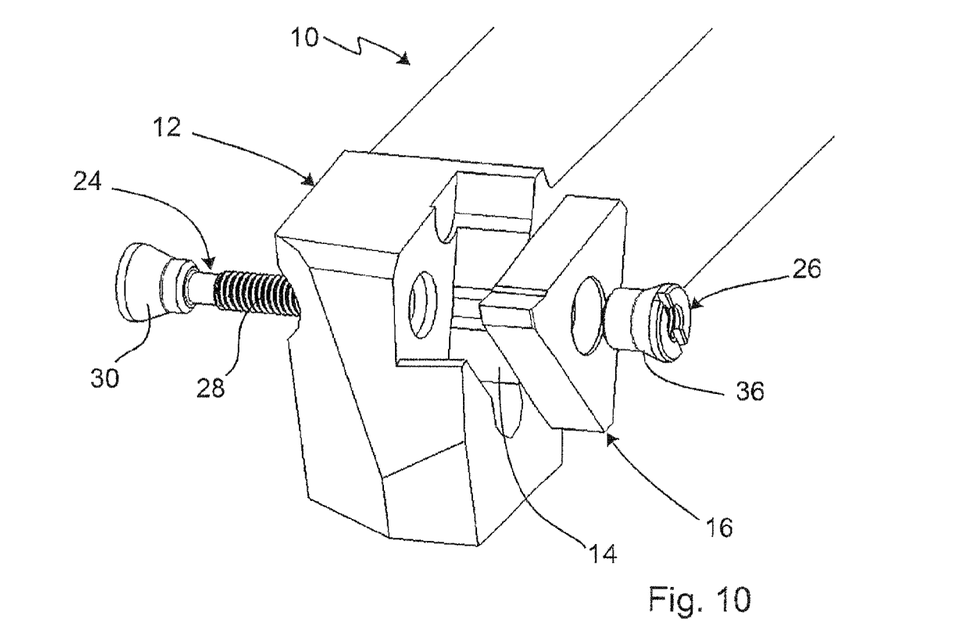
FIG. 10 shows an exploded illustration of a third embodiment of the tool according to the invention in a first assembly method.
Figure 11:
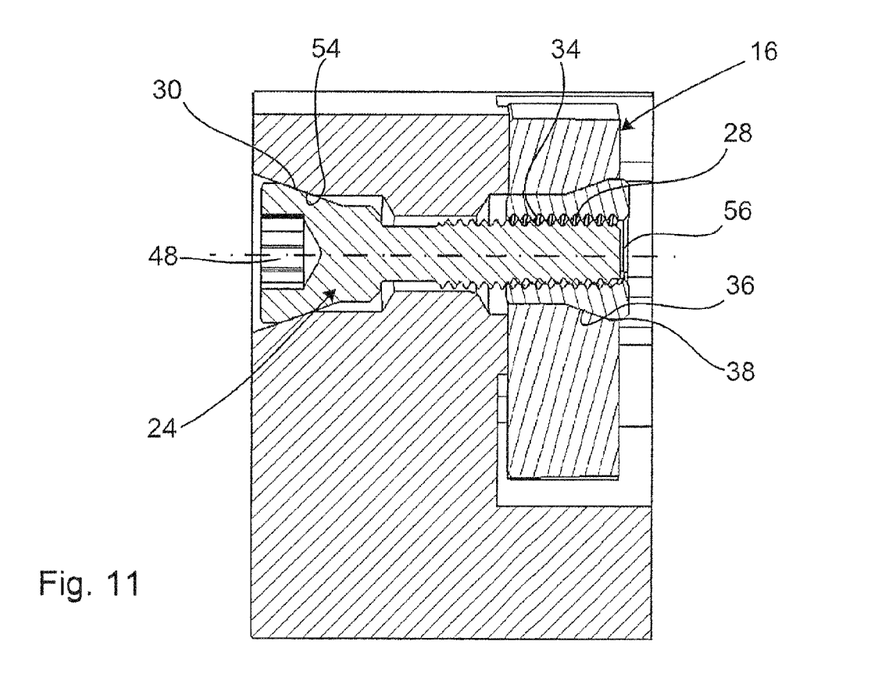
FIG. 11 shows a sectional view of the third embodiment of the tool according to the invention in the first assembly method in the assembled state.
Figure 12:
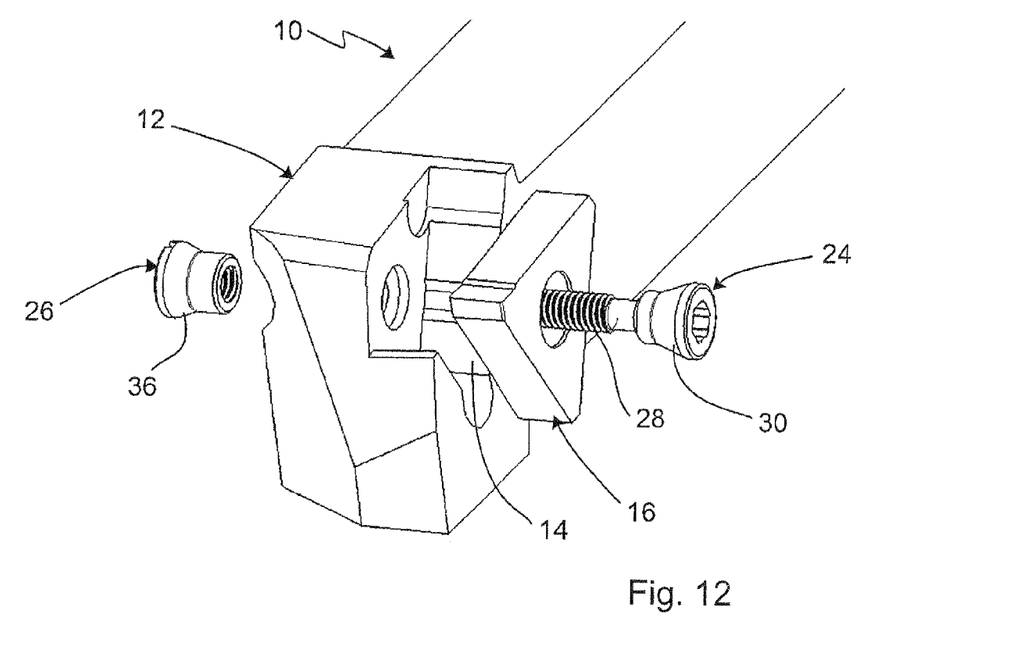
FIG. 12 shows an exploded illustration of the third embodiment of the tool according to the invention in a second assembly method.
Figure 13:
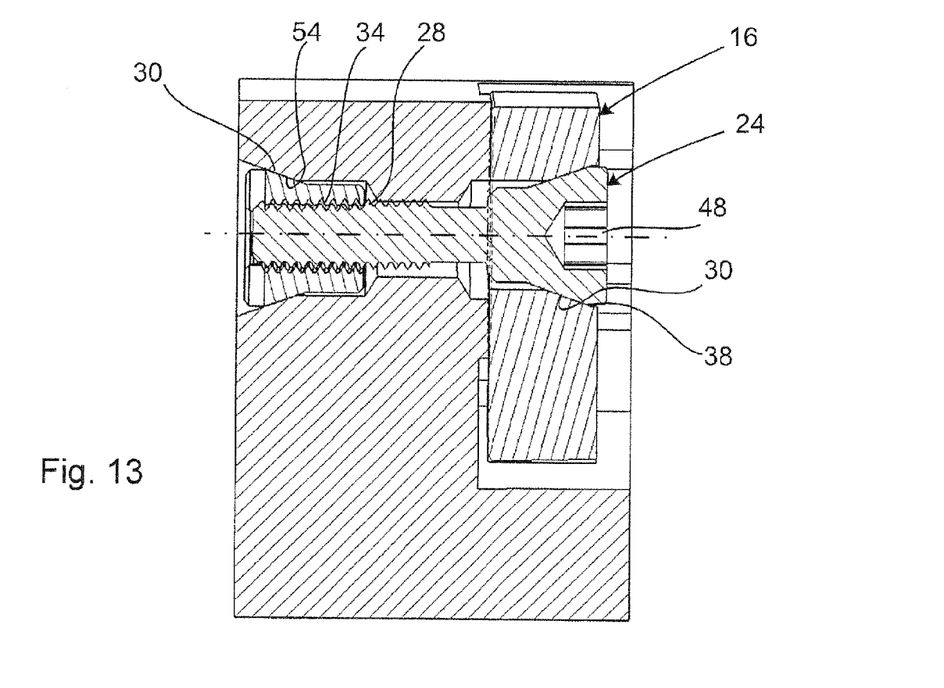
FIG. 13 shows a sectional view of the third embodiment of the tool according to the invention in the second assembly method in the assembled state.

In FIGS. 10 and 11, the clamping screw 24, as in the first assembly method already explained, is inserted into the tool body bore 18 of the tool body 12 from the left. Here, the configuration of the clamping screw 24 and of the clamping hush 26 corresponds substantially to the configuration as already shown in the second embodiment of the tool according to the invention (cf. FIGS. 6 to 9). Here, therefore, the countersunk head 30 of the clamping screw 24 is again designed to be larger, and the tool body bore 18 accordingly has a stepped bore having a bevel 54 on the side remote from the accommodating recess 14, said bevel 54 being adapted to the enlarged countersunk head 30 of the clamping screw 24.

In contrast to the first two embodiments, no internal thread 50 is provided in the tool body bore 18 in the third embodiment. In contrast to the second embodiment, the clamping bush 26 in the second assembly method (FIGS. 12 and 13), in which the clamping screw 24 is inserted into the tool body bore 18 from the right through the cutting tool 16, can no longer be omitted. In this embodiment, therefore, the clamping bush is absolutely necessary in both assembly methods.

As a result of the aforesaid configuration of the clamping screw 24 and of the clamping bush 26, the clamping screw 24 and the clamping bush 26 can be used in both assembly methods, i.e. the clamping screw can be inserted both from the left directly into the tool body bore 18 and from the right through the cutting tool bore 22 into the tool body bore 18.

In the third embodiment, the anti-rotation locking means are designed in the same way as in the first two embodiments by the self-locking of the clamping bush 26. In this case, as already mentioned above, the self-locking of the clamping bush 26 is caused by the surface pressure or friction between the tapered surface 36 of the clamping bush 26 and the beveled part 38 of the cutting tool bore 22 (first assembly method) or between the tapered surface 36 of the clamping bush 26 and the bevel 54 of the tool body bore 18 (second assembly method). The feather keys 44, shown in the first two embodiments, of the clamping bush 26 and the grooves 46 of the tool body bore 18 which are provided for this purpose, said feather keys 44 and grooves 46 being intended to additionally prevent rotation of the clamping bush 26, are not shown here. One of the two types of anti-rotation locking is sufficient in practice, for which reason the groove/feather-key connection has been dispensed with here. However, it goes without saying that the groove/feather-key connection can also be used as anti-rotation locking means in this embodiment.

Overall, therefore, three different configurations of the clamping screw 24 and of the clamping bush 26 are shown, which enable, in a very simple manner, the clamping screw 24 to be inserted into the tool body bore 18 in each case from both sides. Here, the anti-rotation locking means are realized in a very simple manner in all three embodiments of the tool 10. A locking pin as shown in said German Patent Application 10 2007 063 199.7-14 is no longer necessary in any of the three embodiments.

By means of the tool according to the invention, the clamping screw 24, depending on the space required, can therefore be inserted into the tool body bore 18 either from the left or the right and the cutting tool 16 can therefore be screwed tight.

Provided for this purpose in the first embodiment is a clamping bush 26 which, on account of the longitudinal through-bore 32 thereof, can be slipped over the clamping screw 24 in the second possible assembly method (see FIGS. 4 and 5). In the second embodiment (FIGS. 6 to 9), the clamping screw 24 and the clamping bush 26 are of different design from those in the first embodiment. In this case, the clamping screw 24 has a larger countersunk head 30, such that the clamping bush can be omitted in the second assembly method of the second embodiment, namely when screwing in from the right. In the third embodiment (FIGS. 10 to 13), the clamping screw 24 and the clamping bush 26 are configured in the same way as in the second embodiment. In the third embodiment, however, the tool body bore 18 no longer has an internal thread 50, and so the clamping bush 26 is also required in the second assembly method and, in contrast to the second embodiment (cf. FIGS. 8 and 9), cannot be omitted when screwing in from the right.

It goes without saying that the fastening principles shown here can be retained irrespective of the form of the tool body 12, of the cutting tool 16 and of the accommodating recess 14 of the configurations shown here.

The present invention is not restricted to the configurations shown. A multiplicity of further variations are conceivable. In particular, the invention is not restricted to the use in a straight turning tool. It goes without saying that other tools can use this invention. Nor does the type, size and arrangement of the cutting tool have any less of a restrictive effect on the scope of protection of the present invention than the type, size and configuration of the tool body.

What is claimed is:

1. A tool for machining a workpiece, comprising:
a tool body having a tool body through-bore opening into an accommodating recess;
a cutting tool having a cutting edge and a cutting tool through-bore;
a fastener, wherein the fastener fastens the cutting tool in the accommodating recess of the tool body, said fastener having a clamping bush provided with a clamping bush internal thread and a clamping screw provided with a clamping screw external thread corresponding with the clamping bush internal thread, wherein the clamping screw is configured to be inserted from a first side of the tool through the cutting tool through-bore into the tool body through-bore and screwed to the clamping bush, wherein the clamping screw is configured to be inserted from a second side of the tool opposite the first side through the tool body through-bore into the cutting tool through-bore and screwed to the clamping bush; and
an anti-rotation locking means which prevents rotation of the clamping bush about a longitudinal axis thereof when the clamping screw is being screwed to the clamping bush and when the clamping screw is being unscrewed from the clamping bush, wherein the anti-rotation locking means is formed by a tapered surface on the clamping bush and/or by a tapered surface on a head of the clamping screw where the tapered surface on the clamping bush and/or the tapered surface on the head of the clamping screw is adapted to at least part of the tool body through-bore and/or adapted to at least a part of the cutting tool through-bore.

2. The tool as claimed in claim 1, wherein the tool body through-bore has a tool body internal thread corresponding with the clamping screw external thread.

3. The tool as claimed in claim 2, wherein when the clamping screw is inserted from the first side through the cutting tool through-bore into the tool body through-bore, the clamping screw is screwed to the tool body internal thread.

4. The tool as claimed in claim 1, wherein the tool body through-bore is arranged in such a way that a tool body through-bore axis thereof, when the cutting tool is inserted into the accommodating recess but is not yet screwed down, runs slightly offset from a cutting tool through-bore axis of the cutting tool through-bore.

5. The tool as claimed in claim 1, wherein the clamping bush has a longitudinal through-bore.

6. The tool as claimed in claim 1, wherein at least part of the longitudinal through-bore of the clamping bush is adapted to the shape of the head of the clamping screw.

7. The tool as claimed in claim 6, wherein at least part of the longitudinal through-bore of the clamping bush is adapted via a bevel to the shape of the head of the clamping screw.

8. The tool as claimed in claim 1, wherein the clamping bush and the tool body through-bore have a groove/feather-key connection in an inserted state.

9. The tool as claimed in claim 1, wherein the tapered surface on the head of the clamping screw is adapted to at least part of the tool body through-bore and/or at least a part of the cutting tool through-bore.

10. The tool as claimed in claim 1, wherein the clamping screw has a tool engagement means at an end face of the clamping screw.

11. The tool as claimed in claim 1, wherein a length of the clamping bush corresponds substantially to a thickness of the cutting tool.

12. A tool for machining a workpiece, comprising:
a tool body having a tool body through-bore opening into an accommodating recess;
a cutting tool having a cutting edge and a cutting tool through-bore; and
a fastener, wherein the fastener fastens the cutting tool in the accommodating recess of the tool body, said fastener having a clamping bush provided with a clamping bush internal thread and a clamping screw provided with a clamping screw external thread corresponding with the clamping bush internal thread, wherein the tool body through-bore has a tool body internal thread corresponding with the clamping screw external thread, and wherein the clamping screw is configured to be inserted from a first side of the tool through the cutting tool through-bore into the tool body through-bore and screwed to the tool body internal thread, wherein the clamping screw is configured to be inserted from a second side of the tool body opposite the first side through the tool body through-bore into the cutting tool through-bore and screwed to the clamping bush.

13. The tool as claimed in claim 12, further comprising an anti-rotation locking means which prevents rotation of the clamping bush about a longitudinal axis thereof when the clamping screw is being screwed to the clamping bush and when the clamping screw is being unscrewed from the clamping bush, wherein the anti-rotation locking means is formed by a tapered surface on the clamping bush and/or by a tapered surface on a head of the clamping screw, wherein the tapered surface on the clamping bush and/or the tapered surface on the head of the clamping screw is adapted to at least part of the tool body through-bore and/or adapted to at least a part of the cutting tool through-bore.

14. A tool for machining a workpiece, comprising;
a tool body having a tool body through-bore opening into an accommodating recess;
a cutting tool having a cutting edge and a cutting tool through-bore;
a fastener, wherein the fastener fastens the cutting tool in the accommodating recess of the tool body, said fastener having a clamping bush provided with a clamping bush internal thread and a clamping screw provided with a clamping screw external thread corresponding with the clamping bush internal thread, wherein the clamping screw is configured to be inserted from a first side of the tool through the cutting tool through-bore into the tool body through-bore and screwed to the clamping bush, wherein the clamping screw is configured to be inserted from a second side of the tool body opposite the first side through the tool body through-bore into the cutting tool through-bore and screwed to the clamping bush; and
an anti-rotation lock which prevents rotation of the clamping bush about a longitudinal axis thereof when the clamping screw is being screwed to the clamping bush and when the clamping screw is being unscrewed from the clamping bush, wherein the anti-rotation lock is formed by a tapered surface on the clamping bush and/or by a tapered surface on a head of the clamping screw, wherein the tapered surface on the clamping bush and/or the tapered surface on the head of the clamping screw is adapted to at least part of the tool body through-bore and/or adapted to at least a part of the cutting tool through-bore.

15. A tool for machining a workpiece, comprising;
a tool body having a tool body through-bore opening into an accommodating recess;
a cutting tool having a cutting edge and a cutting tool through-bore; and
a fastener, wherein the fastener fastens the cutting tool in the accommodating recess of the tool body, said fastener having a clamping bush provided with a clamping bush internal thread and a clamping screw provided with a clamping screw external thread corresponding with the clamping bush internal thread, wherein the tool body through-bore has a tool body internal thread corresponding with the clamping screw external thread, and wherein the clamping screw is configured to be inserted from a first side of the tool through the cutting tool through-bore into the tool body through-bore and screwed to the tool body internal thread of the tool body through-bore, wherein the clamping screw is configured to be inserted from a second side of the tool opposite the first side through the tool body through-bore into the cutting tool through-bore and screwed to the clamping bush.

* * * * *

UNITED STATES PATENT AND TRADEMARK OFFICE
CERTIFICATE OF CORRECTION

| | | |
|---|---|---|
| PATENT NO. | : 8,747,032 B2 | Page 1 of 1 |
| APPLICATION NO. | : 13/178158 | |
| DATED | : June 10, 2014 | |
| INVENTOR(S) | : Matthias Oettle and Uli Ruoff | |

It is certified that error appears in the above-identified patent and that said Letters Patent is hereby corrected as shown below:

On the Title Page item (57) Abstract,
Line 23, "clamping hush" should read --clamping bush--.

In the Specification:

Column 2,
Line 26, "clamping hush" should read --clamping bush--.

Column 3,
Line 11, "he achieved" should read --be achieved--.

Column 5,
Line 60, "clamping hush" should read --clamping bush--.

Column 6,
Line 12, "clamping hush," should read --clamping bush,--.

Column 8,
Line 54, "clamping hush" should read --clamping bush--.

Column 10,
Lines 31-32, "clamping hush" should read --clamping bush--.

In the Claims:

Column 12,
Line 8, "o f the clamping" should read --of the clamping--.

Signed and Sealed this
Fourteenth Day of October, 2014

Michelle K. Lee
*Deputy Director of the United States Patent and Trademark Office*